(12) United States Patent
Seward et al.

(10) Patent No.: US 11,032,331 B2
(45) Date of Patent: Jun. 8, 2021

(54) BATCHED IMS SIP REGISTRATION PROXY

(71) Applicant: T-Mobile USA, Inc., Bellevue, WA (US)

(72) Inventors: Shelby Seward, North Bend, WA (US); Robert F. Piscopo, Jr., Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 137 days.

(21) Appl. No.: 16/138,458

(22) Filed: Sep. 21, 2018

(65) Prior Publication Data

US 2019/0089751 A1   Mar. 21, 2019

Related U.S. Application Data

(60) Provisional application No. 62/561,656, filed on Sep. 21, 2017.

(51) Int. Cl.
| | |
|---|---|
| *H04L 29/06* | (2006.01) |
| *H04L 29/12* | (2006.01) |
| *H04W 12/06* | (2021.01) |
| *H04L 29/08* | (2006.01) |
| *H04W 12/72* | (2021.01) |

(52) U.S. Cl.
CPC ........ *H04L 65/1073* (2013.01); *H04L 61/256* (2013.01); *H04L 65/105* (2013.01); *H04L 65/1006* (2013.01); *H04L 65/1016* (2013.01); *H04L 67/2833* (2013.01); *H04L 69/22* (2013.01); *H04W 12/06* (2013.01); *H04L 61/3095* (2013.01); *H04L 63/0281* (2013.01); *H04L 63/0884* (2013.01); *H04W 12/72* (2021.01)

(58) Field of Classification Search
CPC ............. H04L 67/2833; H04L 65/1073; H04L 65/1016; H04L 65/1006; H04L 63/0281; H04L 61/3095; H04L 63/0884; H04L 61/256; H04L 65/105; H04L 69/22; H04W 12/06; H04W 12/00514
USPC ......................................................... 709/227
See application file for complete search history.

(56) References Cited

U.S. PATENT DOCUMENTS

| | | | |
|---|---|---|---|
| 9,906,616 B2 * | 2/2018 | Sharma .............. | G06F 16/2379 |
| 9,913,252 B2 | 3/2018 | Basavaraj et al. | |
| 10,028,175 B2 | 7/2018 | Sharma et al. | |
| 2007/0287454 A1 * | 12/2007 | Zhu ........................ | H04W 8/10 455/435.1 |
| 2008/0155658 A1 * | 6/2008 | Leinonen .............. | H04L 63/205 726/4 |

(Continued)

*Primary Examiner* — Hamza N Algibhah
*Assistant Examiner* — John Fan
(74) *Attorney, Agent, or Firm* — Han Santos, PLLC

(57) ABSTRACT

In some aspects, a Session Initiation Protocol (SIP) proxy server of an Internet Protocol Multimedia Subsystem (IMS) infrastructure is configured to process SIP registration requests. In operation, the SIP proxy server receives a single SIP registration request that includes a plurality of IMS Public User Identities (IMPUs). The SIP proxy server then authenticates the plurality of IMPUs to determine which of the plurality of IMPUs are authorized IMPUs. A plurality of SIP registrations are then performed by the SIP proxy server, wherein each SIP registration of the plurality of SIP registrations is a SIP registration of a respective authorized IMPU.

19 Claims, 5 Drawing Sheets

(56) References Cited

U.S. PATENT DOCUMENTS

| | | | |
|---|---|---|---|
| 2010/0199330 A1* | 8/2010 | Schott | H04L 65/1073 |
| | | | 726/4 |
| 2012/0042084 A1* | 2/2012 | Dutta | H04L 65/1069 |
| | | | 709/228 |
| 2013/0028195 A1* | 1/2013 | Xie | H04W 36/0022 |
| | | | 370/328 |
| 2013/0084860 A1* | 4/2013 | Wong | H04W 60/00 |
| | | | 455/435.1 |
| 2017/0041284 A1* | 2/2017 | Chen | H04L 61/103 |
| 2017/0104795 A1* | 4/2017 | Gundavelli | H04L 65/1073 |
| 2018/0124604 A1* | 5/2018 | Rajadurai | H04L 65/4061 |

* cited by examiner

300

500

BATCHED IMS SIP REGISTRATION PROXY

CROSS-REFERENCE TO RELATED APPLICATION

This application claims the benefit of U.S. Provisional Application No. 62/561,656, entitled "IMS SIP Registration Proxy," filed Sep. 21, 2017 and expressly incorporated herein by reference in its entirety.

BACKGROUND

Internet Protocol (IP) Multimedia Subsystem (IMS) is a common infrastructure to access application services via a telecommunications carrier. Session Initiation Protocol (SIP) is a standard protocol typically used to gain access to those application services. Specifically, a SIP client, generally running on user equipment such as a mobile phone, may attempt to gain access to an application service available via IMS infrastructure by registering itself with an IMS registrar.

It is now common for a single user to be associated with multiple devices. For example, a user may own a smart phone and a tablet device both with cellular connectivity. Also, a device may be associated with many users. For example, a tablet device may be operated both by a child as well as the child's parent. However, presently SIP registrations are performed for one user equipment device, for one identity at a time, rather than being configured to support one-to-many or many-to-many scenarios. Specifically, registering multiple identities or devices is performed via multiple SIP registration requests to an IMS registrar, one for each device-identity combination. Accordingly, there is a need to enable multiple SIP registrations via a single SIP registration request to the IMS registrar.

BRIEF DESCRIPTION OF THE DRAWINGS

The Detailed Description is set forth with reference to the accompanying figures.

DETAILED DESCRIPTION

Context of Batched IMS SIP Registration

SIP registration is commonly used by telecommunications carriers to provide access to application services within IMS. Services may include Voice over Long Term Evolution (VoLTE) calls, Wi-Fi™ calling both current and legacy versions, and any service that may be exposed via a telephony application server.

Figure 1:
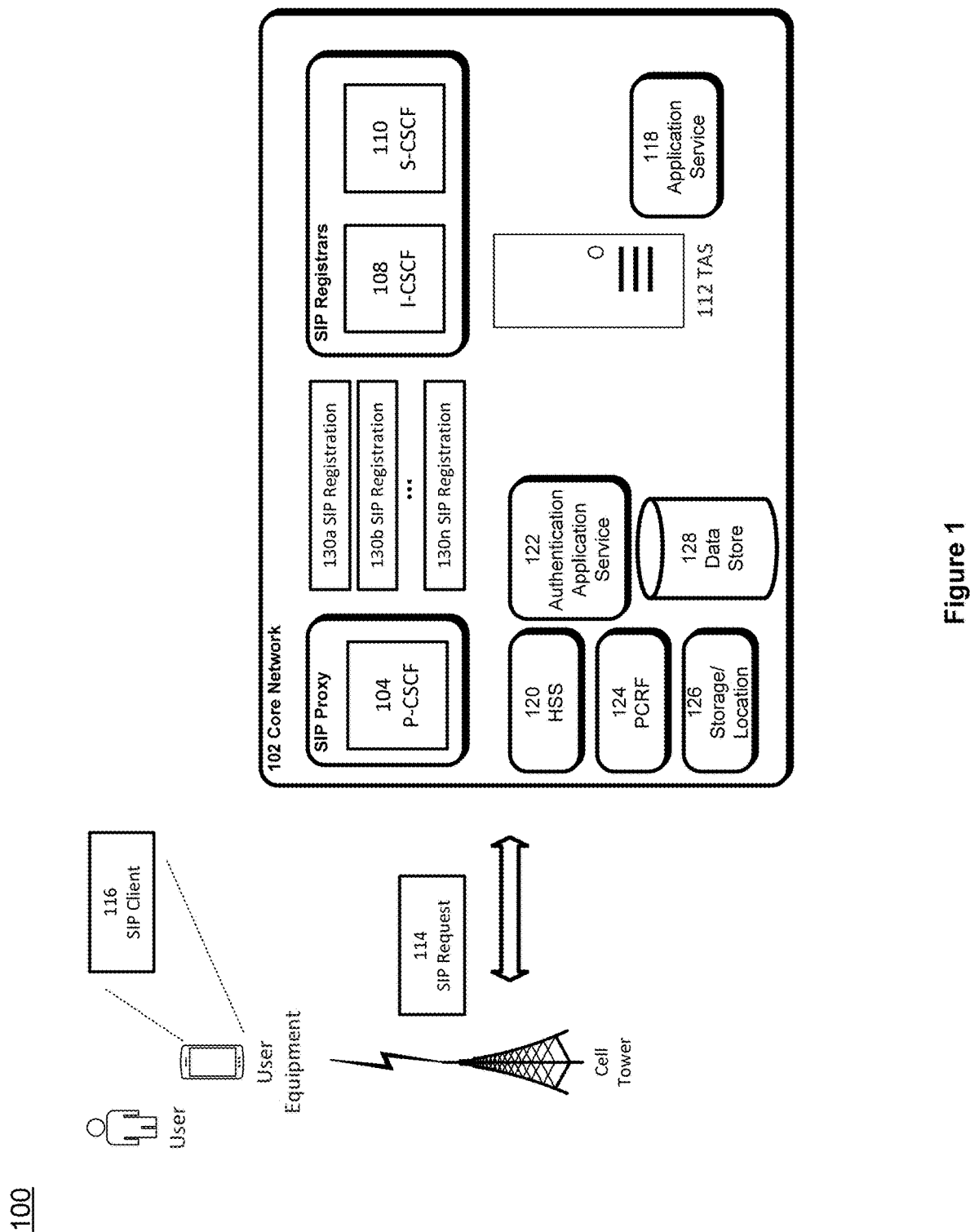
FIG. 1 is a context diagram for batched IMS SIP registration.

When a SIP client has multiple identities, it might be obliged to create multiple, separate SIP registrations. By the techniques disclosed herein, instead a SIP client may send over multiple identities in a single SIP registration request to an IMS registrar via a SIP proxy, which may in turn initiate multiple registration requests on a per device and user basis. Although multiple registration requests are being executed, from the perspective of the SIP Client, only a single request was sent, thereby simplifying interaction and obviating multiple registration round trips over the network. FIG. 1 is a contextual diagram 100 for this interaction.

A typical registration with IMS infrastructure via SIP involves coordinating multiple functions within a Core Network 102 of a telecommunications carrier. IMS functions include an IMS Proxy-Call Session Control Function (P-CSCF) 104, an IMS Interrogating-Call Session Control Function (I-CSCF) 108, a Serving-Call Session Control Function (S-CSCF) 110, and a Telephony Application Server (TAS) 112. The P-CSCF 104 may be alternatively referred to as a SIP proxy, as it performs a proxy interfacing role for the IMS infrastructure for performing SIP operations. The I-CSCF and the S-CSCF may both be referred to as a SIP registrar as they register the identity of parties seeking access to a TAS 112 in their domain. As the SIP proxy and the SIP registrar or registrars collectively perform registration services for the IMS infrastructure as a whole, the SIP proxy and the SIP registrar or registrars may be referred to as an IMS registrar.

In an ordinary SIP registration, the P-CSCF 104 receives a registration request 114 from a SIP Client 116 (e.g., user equipment, user device, etc.) that is seeking access to an application service 118 running on the TAS 112. The P-CSCF 104 then initiates registration services for the SIP Client 116. The P-CSCF 104 may then call the I-CSCF 108, which is locatable via Domain Name Service (DNS) (not shown). The I-CSCF 108 may then in turn interrogate a Home Subscriber Service (HSS) 120 for the location of the S-CSCF 110 corresponding to the TAS 112 with the application service 118 that the SIP Client 116 is seeking. Note that unlike the I-CSCF 108, the S-CSCF 110 is not necessarily locatable via DNS. Upon the I-CS CF 108 forwarding the registration request 114 to the S-CSCF 110, the S-CSCF 110 facilitates registration and handshaking between the TAS 112 and the SIP Client 116. Upon completion, the SIP Client 116 has a session with the TAS 112 to invoke the requested application service 118.

The P-CSCF 104 may also initiate authentication and other validations prior to permitting a SIP Client 116 to access an application service 118. Authentication and other validations may be performed in conjunction with an authentication application service 122 and a Policy Control Rules Function (PCRF) 124.

However, to enable multiple SIP registrations via a single SIP registration request to the IMS registrar, the configuration is modified in several ways. First, the registration request 114 is configured to contain a SIP header with multiple identities to register batched together. This header, called a P-Preferred-Association, and related headers are described in further detail with respect to FIG. 3.

Second, the P-CSCF 104 is configured to recognize when a P-Preferred-Association is present in a registration request 114, and to perform steps which ultimately unpack the batched identities, potentially using a supplementary storage 126 and an external identity database 128 to initiate multiple SIP registrations 130a-n. Since the P-CSCF 104 is initiating the multiple SIP registrations, this process is not visible to the SIP Client 116 (i.e., the SIP client 116 only made a single SIP request 114). The authentication portion of these techniques is described in greater detail with respect to FIG. 4. The initiation of multiple SIP registrations is described in greater detail with respect to FIG. 5.

Accordingly, aspects of the present disclosure include performing multiple Session Initiation Protocol (SIP) registrations corresponding to multiple identities batched in a single SIP registration request to an Internet Protocol Multimedia System (IMS) within a telecommunications carrier. Supplementary SIP headers are described that contain a batch of identities to register as well as other SIP headers to mediate communication. In one embodiment, the batch of identities are presented in a single SIP request to a SIP proxy. The SIP proxy then creates multiple separate and independent SIP registrations to the SIP registrar. In another embodiment, the SIP proxy interprets the lack of a SIP header with a batch of identities as triggering a workaround, creates a SIP registration and places itself in the path for subsequent SIP messages and methods to route to the created registration. Techniques to handle method routing are then described.

Exemplary Environment for Batched IMS SIP Registration

Prior to turning to describing batched IMS SIP registration techniques themselves, the following describes an exemplary hardware, software and communications environment for those techniques.

Figure 2:
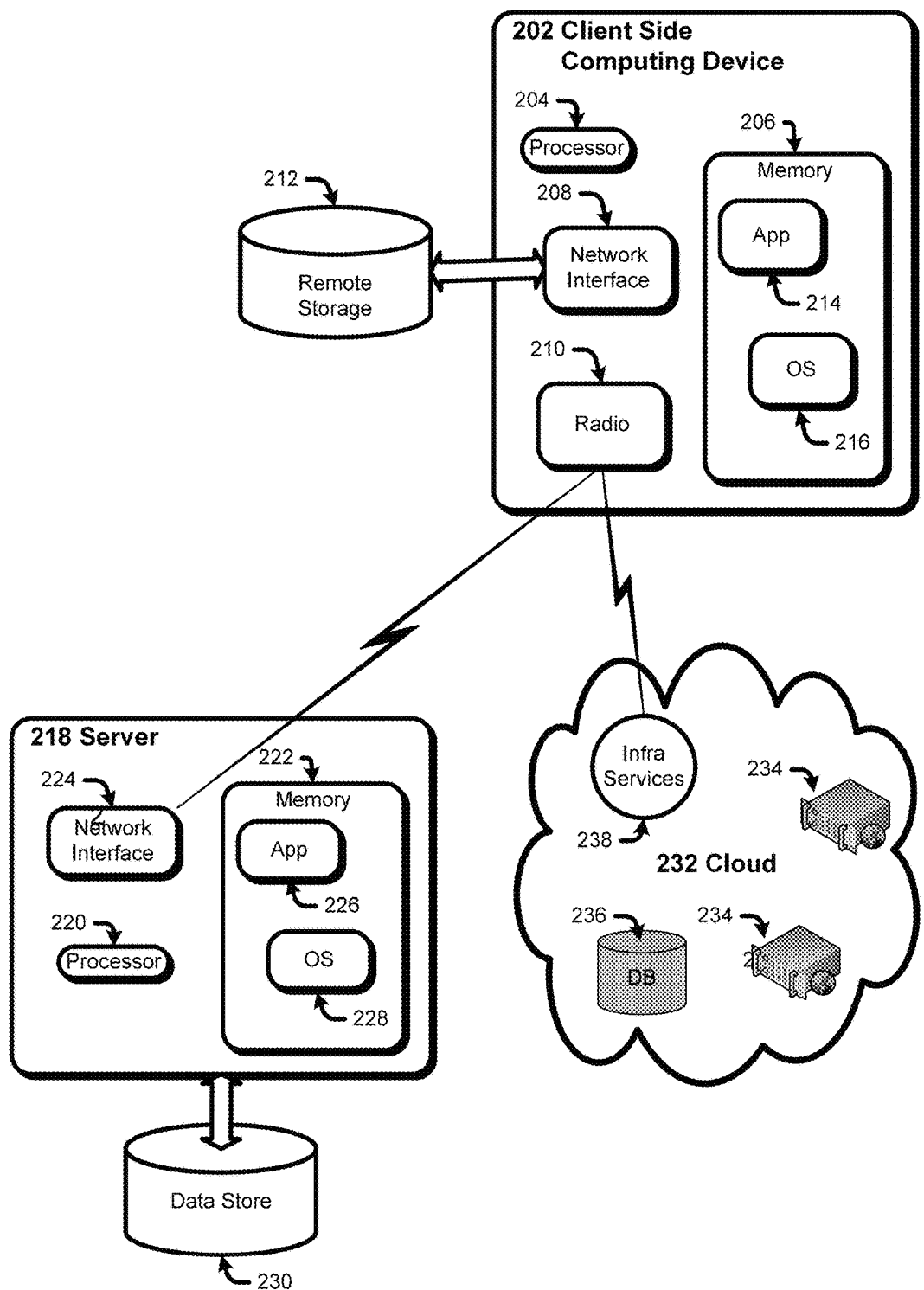
FIG. 2 is a block diagram of an example computing environment for batched IMS SIP registration.

FIG. 2 is an environment diagram 200 for batched IMS SIP registration techniques. Client-side functionality is hosted on a computing device. Exemplary computing devices include without limitation personal computers, laptops, embedded devices, tablet computers and smart phones. Generally, the computing devices participate in a telecommunications network and are also known in the telecommunications industry as user equipment.

The client-side computing device 202 has a processor 204 and a computer readable memory 206. The processor 204 may be a central processing unit or a dedicated controller such as a microcontroller. The computing device 202 may further include an input/output (I/O) interface (not shown), and/or a network interface 208. The I/O interface may be any controller card, such as a universal asynchronous receiver/transmitter (UART) used in conjunction with a standard I/O interface protocol such as RS-232 and/or Universal Serial Bus (USB). The client-side computing device 202 may participate in a cellular network via a cellular radio 210. Alternatively, the client-side computing device 202 may participate in a wireless local network via network interface 208 working in concert with the I/O interface. The network interface 208 may be a network card supporting Ethernet and/or Wi-Fi™ and/or any number of other physical and/or datalink protocols. In some cases, the network interface 208 may work in conjunction with a remote storage 212 storing computer readable data and/or computer readable instructions.

Memory 206 is any computer-readable media which may store several software components including applications 214 and an operating system 216. Applications 214 may include a SIP Client 116. The operating system 216 may include communications drivers for the network interface including a radio access interface to participate in a cellular network, and communications drivers to support Wi-Fi™ and other network protocols.

In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

A server 218 is any computing device that may participate in a network. The network may be, without limitation, a local area network ("LAN"), a virtual private network ("VPN"), a cellular network, or the Internet. Server 218 is one possible implementation of a SIP proxy server, such as the SIP proxy of FIG. 1. Similar to the client-side computing device 202, the server 218 may include at least one processor 220, at least one memory 222, an input/output interface (not shown) and a network interface 224. The memory 222 may store applications 226 and an operating system 228. The network interface 224 may optionally work in conjunction with a remote storage 230 storing computer readable data and/or computer readable instructions.

In one aspect, a non-transitory computer-readable medium, such as memory 222, is adapted to store program code. The program code includes instructions, which when executed by processor 220 direct the server 218 to perform one or more operations as described herein. For example, as will be described in more detail below, instructions included in the program code stored in memory 222, may be configured to direct the server 218 to receive (e.g., via network interface 224) a single SIP registration request (e.g., SIP Request 114) and to perform multiple SIP registrations (e.g., SIP Registrations 130a-n) in response to the single SIP registration request.

A service on the cloud 232 may provide the server computer services via one or more virtual machines. Specifically, a server, may either be a physical dedicated server 218, or may be a virtual machine on a cloud server 232. In the latter case, the cloud 232 is constituted by one or more disaggregated physical servers which provide virtual application server 234 functionality (compute servers) or virtual storage/database 236 functionality (storage servers). The disaggregated servers are physical computer servers, as described with respect to servers 218, and accordingly may have a processor, a memory, an I/O interface and a network interface. The features and variations of the processor, the memory, the I/O interface and the network interface are substantially similar to those described for the server 218. Some differences may occur where the disaggregated servers are optimized for throughput and/or for disaggregation.

Cloud 232 servers 234 and 236 may be made accessible via an integrated cloud infrastructure 238. Cloud infrastructure 238 not only provides access to cloud servers 234 and 236 but also to billing services and other monetization services. Cloud infrastructure 232 may provide additional service abstractions such as Platform as a Service ("PAAS"), Infrastructure as a Service ("IAAS"), and Software as a Service ("SAAS").

Supporting SIP Headers for Batched IMS SIP Registration

Figure 3:
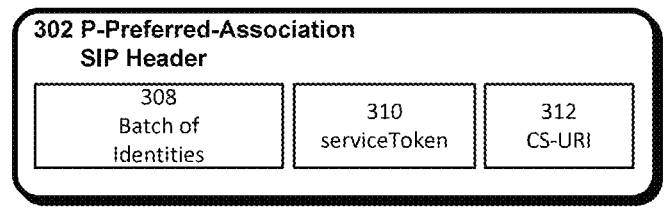
FIG. 3 is a diagram of exemplary SIP headers used for batched IMS SIP registration.
Figure 3:
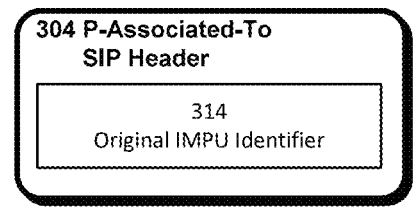
Figure 3:
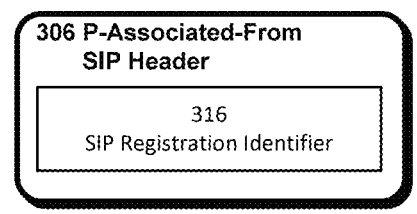

The discussion around FIG. 1 described the different functionalities participating in batched IMS SIP registration. FIG. 3, is an illustration 300 of various SIP headers used to pass information among these functionalities. There are three SIP headers used in batched IMS SIP registration: (1) a P-Preferred-Association header 302, (2) a P-Associated-To SIP header 304, and (3) a P-Associated-From SIP header 306.

The P-Preferred-Association header 302, is the vehicle to batch multiple identities. Specifically, the P-Preferred-Association header 302 stores a set of multiple identities in a batch of identities 308 field included as part of a SIP registration request 114 received from a SIP Client 116. The multiple identities in the batch of identities 308 may be represented as a plurality of IMS Public User Identities (IMPUs). Note that prior to IMPUs, identifiers might relate to a line or to a device. Here, each IMPU is specific to a user (e.g., see 'User' in FIG. 1).

In some embodiments, the P-Preferred-Association header 302 may optionally contain a serviceToken 310 which stores a client identity not specific to the SIP protocol. Specifically, clients often log in to and are authenticated by non-SIP based methods. In this event, the serviceToken 310 allows servers to map SIP methods to a corresponding non-SIP identity.

In other embodiments, the P-Preferred-Association header 302 may optionally contain a CS-URI (standing for Client-Side Uniform Resource Identifier) field 312. The CS-URI field 312 stores a device identifier of the registering user equipment (e.g., see 'user equipment' of FIG. 1) distinct from the identity of the user which is represented by an IMPU in the batch of identities 308. An example device identifier is a Mobile Station Identity Subscriber Directory Number (MSISDN). MSISDNs, often known as "phone numbers," are numbers specified by the E.164 numbering plan in the International Telephone Union's ITU-T standard. If the CS-URI is present in the P-Preferred-Association header 302, application servers, such as server 218, may use this information to identify the native MSISDN for devices mapped to the International Mobile Subscriber Identity (IMSI) numbers associated with a user's Subscriber Identity Module (SIM) card on the registering user equipment.

The P-Associated-To SIP header 304 is associated with methods received by the SIP Client 116. The P-Associated-To SIP header 304 has an IMS IMPU field (i.e., Original IMPU identifier 314) used to store the IMPU identity associated with the original registration request 114. Note that since identities are batched in the registration request 114, the identity (IMPU) sought by a method call may not be the original identity (IMPU e.g. a SIP/TEL URI) of the request 114.

The P-Associated-From SIP header 306 is a header from the SIP Client 116 for a method call to the IMS infrastructure that contains a SIP Registration identifier 316 for the created SIP registration that the method call should use in order to invoke the requested application service 118. Specifically, after a SIP registration has been established for a SIP Client 116, method calls from the SIP Client 116 upon being received by the IMS infrastructure are to be routed over that established SIP registration.

Exemplary Method for Authenticating and Initiating Batched IMS SIP Registration

Upon receiving a SIP registration request 114 that includes a plurality of IMPUs (e.g., as indicated in the batch of identities 308 field of example P-Preferred-Association header 302), the SIP proxy server (e.g., P-CSCF 104) may perform authentication of the IMPUs. The SIP proxy may perform authentication using SIP methods and may retrieve authentication information from the Authentication application service 122 and/or the data store 128. Alternatively, the SIP proxy server may use non-SIP methods by delegating authentication to another application server such as Authentication application service 122 or data store 128.

Figure 4:
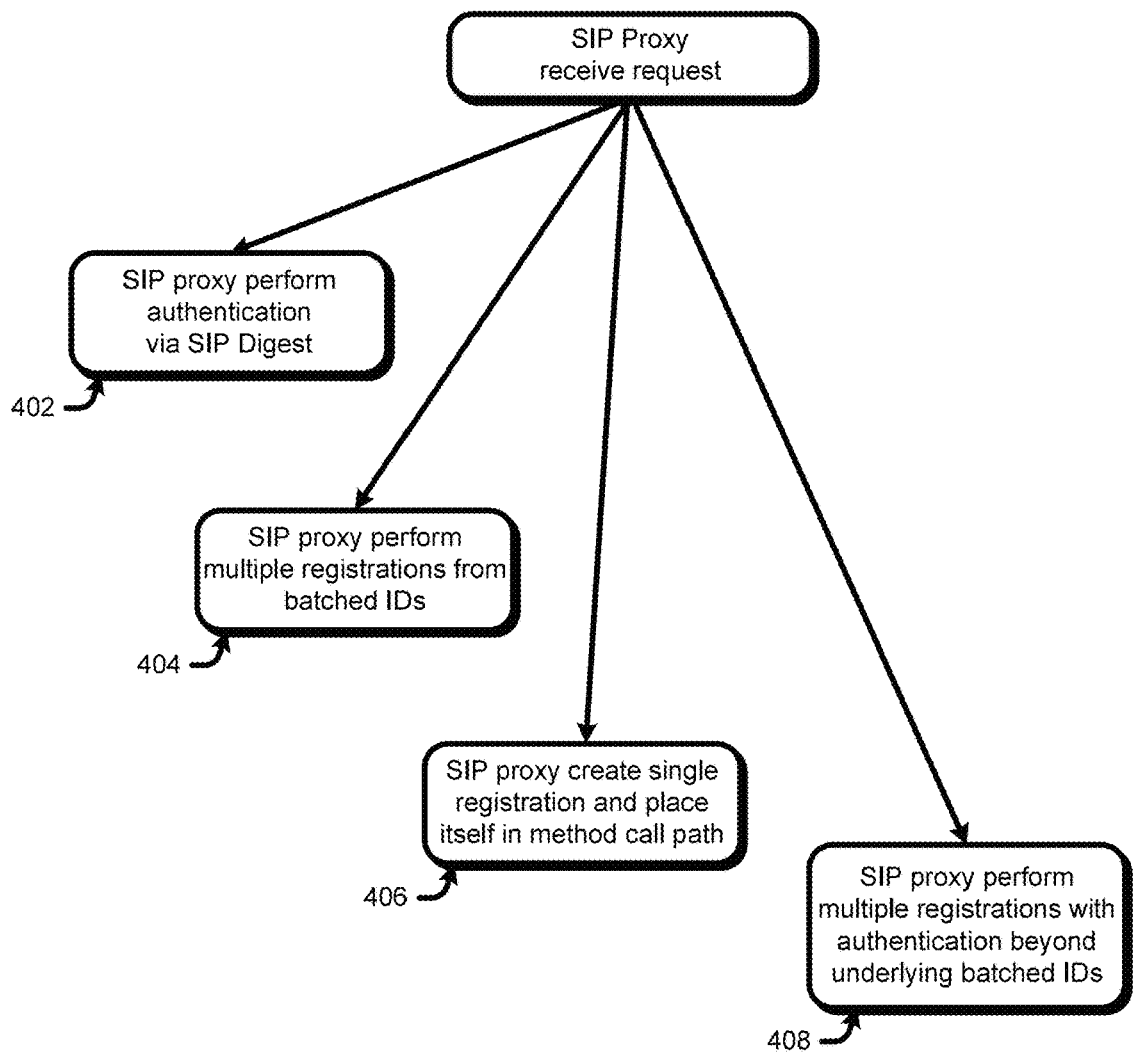
FIG. 4 is a flow chart for exemplary authentication and registration techniques upon received batched IMS SIP registration identities.

As shown in flow chart 400 in FIG. 4, the authentication process supports four scenarios. In the first scenario 402, the SIP proxy server (e.g., server 218 and/or P-CSCF 104) performs authentication using a SIP digest. In the second scenario 404, the SIP proxy server performs authentication using solely the IMPUs included in the batch of identities 308 field of the P-Preferred-Association header 302. In the third scenario 406, the SIP proxy server does not receive a P-Preferred-Association header 302. In the fourth scenario 408, the SIP proxy uses more than the IMPUs included in the P-Preferred-Association header 302 to perform authentication.

SIP Proxy Authenticates Using SIP Digest

In some aspects, a SIP proxy server may access a SIP digest or algorithm to calculate a SIP digest at a predetermined address or location 126 within the IMS infrastructure. SIP Digests are hashed values of SIP messages. A SIP client 116 may calculate the value of a digest for a message and may append that value to the message. A recipient of that message, such as a SIP proxy server, may then calculate the value of the digest for the message independently. If the values match, then the received message is authenticated.

In this scenario (i.e., scenario 402 of FIG. 4), the SIP proxy server performs authentication using a SIP digest. If the SIP proxy server is configured to perform the authentication itself, it calls an authentication application service 122 to perform the digest check. In general, the SIP proxy server is able to determine the identities associated with a SIP registration request from an external application server 122. The determined identities are those identities which are authorized to present themselves in the home SIP Registrar (I-CSCF/S-CSCF) 108, 110.

If the SIP proxy server is configured to delegate the authentication to a non-SIP service, the SIP proxy server may extract a non-SIP identity by parsing the serviceToken field 310 of the P-Preferred-Association header 302. The non-SIP identity is then authenticated against an external non-SIP authentication application service 122 or data store 128. Specifically, the non-SIP identity may be used by the SIP proxy server to query an external non-SIP authentication application service 122 or data store 128 to obtain a list of identities that are authorized to present themselves in the home SIP registrar or registrars (I-CSCF/S-CSCF) 108, 110. In one embodiment, the obtained list of identities is a list of IMSI numbers to be presented to the S-CSCF 110.

Batch Registration Using Underlying Identities in P-Preferred-Association

In some aspects, the SIP proxy (P-CSCF) 104 initiates a batch registration. This scenario (e.g., scenario 404 of FIG. 4) may apply if an authentication has already occurred. Because the SIP Proxy server operates as a service, the SIP Proxy server services requests as they arrive which may cause processing to be subdivided.

In this scenario 404, the SIP proxy server extracts, from the P-Preferred-Association header 302, the identities (e.g., IMPUs) included in the batch of identities 308 field that are to be registered. For each identity in the batch of identities 308 field, the SIP proxy server then proceeds to perform an independent and separate SIP registration to the home SIP registrar (I-CSCF/S-CSCF) 108, 110. The result is the plurality of SIP registrations 130*a-n* to the SIP registrar from a single SIP request 114.

P-Preferred-Association SIP Header not Populated

In some examples, the P-Preferred-Association SIP header 302 is not populated. The most common reason for this to happen is that the SIP request 114 is not a batched identity request. However, in the scenario 406 where the P-Preferred-Association is not populated, but the request 114 is indeed a batched identity request, then SIP client 116 itself may be used as the underlying identity. Since the SIP proxy server manages a session with the SIP client 116, it can be used to track the SIP client 116.

In one embodiment, the SIP proxy server creates a single SIP registration 130*a* to the home SIP registrar (I-CSCF/S-CSCF) 108, 110 and places itself (the proxy server) in the path of subsequent SIP methods (e.g., service call invocations to the SIP registrar 108, 110, the TAS 112, or the application service 118). In this way, when a SIP method is received, the SIP proxy server can intercept the method and route the method via the single registration 130*a*.

The SIP proxy server is able to place itself in the path of subsequent SIP methods by placing its network address, such as its Internet Protocol (IP) address and its Fully Qualified Domain Name (FQDN) in the Via SIP header of the SIP register. The SIP proxy's IP and FQDN is then placed in the service-route headers of SIP methods and other SIP messages of the SIP client 116. In this way, the service-route header can lookup the IP/FQDN in the SIP register and find the SIP proxy and thereafter the single SIP registration 130*a*.

Enhanced Batch Registration Using P-Preferred-Association

In one example, scenario 402 performs batch registration using only the underlying identities stored in the P-Preferred-Association SIP header 302. In scenario 408, information beyond the identities is used for identification and authentication to the SIP registrar 108/110 (I-CSCF/S-CSCF).

For additional identification and authorization, the SIP proxy server may authenticate at least a portion, if not all, of the Uniform Resource Identifier (URI) for the SIP client 116 that had been previously placed in a P-Preferred-Identity SIP header. At a minimum, the user portion of the URI may be authenticated.

For each identity in the batch of identities 308 field in the P-Preferred-Association SIP header 302, the SIP Proxy server then retrieves the associated public identities and private identities by using the identity to query an external Authentication application service 122 or data store 128. In some embodiments the public identity is the IMPU and the private identity is the IMS Private Identity (IMPI).

Note that operations by the SIP proxy server in the scenario 408 may be done securely. Specifically, the SIP proxy server may access SIP digest information from a predetermined location 126 in the IMS infrastructure and may make use of SIP digest techniques to authenticate messages between the SIP client 116 and the SIP registrar (I-CSCF/S-CSCF) 108, 110. Also, the SIP proxy server may send auth-done messages in the integrity protected portion of the SIP contact address.

In this scenario 408, upon successful authentication, the SIP proxy server may create independent and separate SIP registrations 130*a-n* with the SIP registrar (I-CS CF/S-CSCF) 108, 110 for each of the identities in the batch of identities 308 field of the P-Preferred-Association SIP header 302. As with scenario 404, the result is multiple SIP registrations 130*a-n* in response to a single SIP request 114.

Exemplary Method for Processing SIP Messages and Methods with Batched IMS SIP Registration In some cases, the SIP proxy server may place itself (in the form of its IP/FQDN) in the path of subsequent SIP methods. For example, in scenario 406, because there was no P-Preferred-Association header 302 present, the SIP proxy server did not receive a batch of identities 308. Accordingly, the SIP proxy server created a single SIP registration and placed itself in the path of subsequent SIP methods. In the particular scenario 406, since there is only one single SIP registration 130*a* the following techniques manage routing through that registration 130*a*. There are other cases where the SIP Proxy server places itself in the path of SIP methods.

Figure 5:
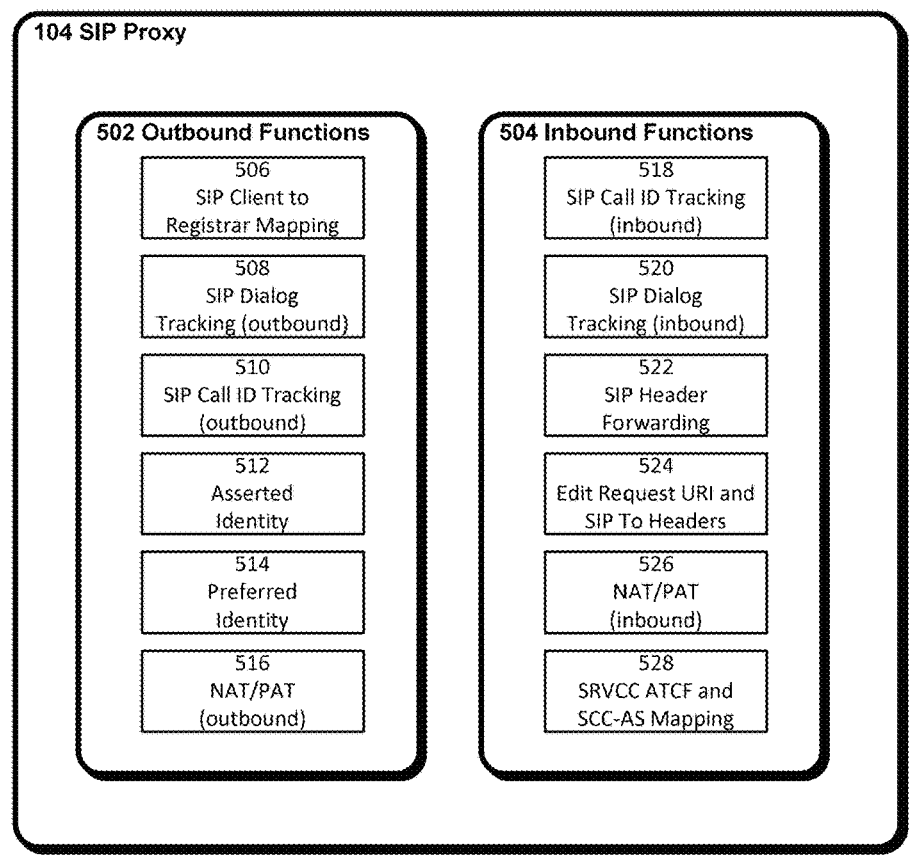
FIG. 5 is a block diagram for one embodiment for routing SIP methods using batched IMS SIP registration.

FIG. 5 is a block diagram 500 of the techniques. Routing in this scenario 406 involves behavior of a SIP proxy server (e.g., P-CSCF 104 of FIG. 1, server 218 if FIG. 2, etc.) for outbound communications to the SIP client 116 and inbound communications to the SIP registrar (I-CSCF/S-CSCF) 108, 110. Outbound techniques are shown in block 502 and inbound techniques are shown in block 504.

Outbound Communications to the SIP Client

For outbound communications, the SIP proxy 104 is to identify at least one SIP registration 130*a-n* to send subsequent SIP methods. A SIP dialog is an exchange of SIP messages. Accordingly, there is opportunity to make use of information from prior messages. Block 506 illustrates mapping a SIP client 116 to a SIP registrar (I-CSCF/S-CSCF) 108, 110.

When a SIP client 116 sends a P-Associated-From SIP header 306 in an initial outbound SIP method, the SIP proxy (P-CSCF) 104 matches the URI in the P-Associated-From SIP header 306 to the SIP registration 130*a* to find the appropriate home SIP registrar (I-CSCF/S-CSCF) 108, 110. This SIP registration 130*a* is then the registration to send subsequent SIP methods. To do this, the SIP proxy 104 may match the identity (e.g., SIP Registration Identifier 316) in the P-Associated-From SIP header 306 with the P-Associated-URI header received from the "200 OK" message from each of the prior SIP registrations with each of the SIP registrars.

In block 508, the SIP proxy (P-CSCF) 104 tracks SIP dialogs. Specifically, upon identifying the registration 130*a*, the SIP proxy 104 maintains a mapping of the SIP client 116 to the registration 130*a*, in particular to the SIP registrar 108, 110 (I-CSCF, S-CSCF) where the registration occurred. Specifically, the SIP proxy 104 keeps track of all SIP dialogs that have been established and mapped between the SIP client 116 and the appropriate SIP registrar 108, 110 in order to send subsequent SIP messages within that SIP dialog and to forward them to the mapped SIP registrar 108, 110.

Similarly, in block 510 the SIP Proxy (P-CSCF) 104 also keeps track of inbound SIP Call ID's from the SIP Registrar (I-CSCF/S-CSCF) 108, 110 so that a response by the SIP client shall be mapped to the correct SIP Registrar 108, 110.

In some cases, the SIP proxy (P-CSCF) 104 may have received a P-Asserted-Identity SIP header. Block 512 contains the process to handle P-Asserted-Identity. Because a P-Asserted-Identity would have been placed subsequently, the SIP proxy 104 may make use and store URI's in the P-Associated-URI SIP header based on the P-Associated-From SIP header 306 and the P-Asserted-Identity SIP header. Specifically, one of the identities 308 in the P-Associated-From SIP header 306 may match the P-Asserted-Identity sent to the home SIP registrar (I-CSCF/S-CSCF)

108, 110. Where such a match occurs, communications make use of the registration mapped to that matching identity.

In some cases, the SIP proxy (P-CSCF) 104 may receive a P-Preferred-Identity SIP header. This eventuality is handled in block 514. Here, because the SIP proxy is performing P-CSCF functions, the received P-Preferred-Identity should not be used. Instead, the SIP proxy may select one of the URIs in a P-Associated-URI SIP header. The selection is based upon finding a match in the P-Associated-From SIP header 306 to the P-Asserted-Identity SIP header (which had been sent to the home SIP Registrar (I-CSCF/S-CSCF) 108, 110). The P-Preferred-Identity header may then be removed.

Network Address Translation (NAT) and Port Address Translation (PAT) are techniques to manage IP addresses. Block 516 handles cases supporting NAT and PAT. Specifically, the SIP proxy (P-CSCF) 104 may detect that NAT/PAT is supported and may subsequently change the addresses in the contact header between the SIP client 116 and the SIP registrar (I-CSCF/S-CSCF) 108, 110. In general, the SIP proxy 116 may manipulate the SIP headers to provide the correct addresses based on NAT/PAT lookup.

Inbound Communications with the SIP Registrar

Behaviors of a SIP proxy 106 for inbound communications with respect to the SIP registrar (I-CSCF/S-CSCF) 108, 110, are shown in block 504.

In block 518, the SIP Proxy (P-CSCF) 104 tracks inbound Call IDs for inbound calls as the analog to Call IDs for outbound communications in block 510. Specifically, the SIP proxy 104 tracks inbound SIP Call ID's from the SIP client 116 so that responses by the SIP Registrar (I-CSCF/S-CSCF) 108, 110 are mapped back to the correct SIP client 116.

In block 520, the SIP proxy (P-CSCF) 104 performs SIP dialog tracking from an inbound traffic perspective, as an analog to SIP dialog tracking for outbound traffic in block 508. Specifically, the SIP proxy 104 tracks all SIP dialogs that have been established and mapped between the SIP client 116 and the appropriate SIP registrar (I-CSCF/S-CSCF) 108, 110. The SIP proxy 104 then forwards all subsequent messages within that SIP dialog to the appropriate SIP registrar.

The SIP proxy (P-CSCF) 104 generally may forward headers, as shown in block 522. This enables the SIP registrar (I-CSCF/S-CSCF) 108, 110 to pass on any SIP header to the SIP client 116 based upon received predetermined configuration settings.

In block 524, the SIP registrar (I-CSCF/S-CSCF) 108, 110 is able to change the Request URI and SIP To headers of incoming SIP methods from the SIP Registrar 108, 110. Specifically, the SIP registrar 108, 110 selects a URI from a P-Associated-URI SIP header directly associated with the SIP registration 130a between the SIP client 116 and initial SIP Proxy 104, and replaces the Request URI and SIP To headers with the selected URI.

In block 526, the SIP proxy (P-CSCF) 104 supports NAT and PAT for inbound traffic, analogous to block 516 for outbound traffic. Specifically, the SIP proxy 104 is able to look up an address per NAT or PAT, access the contact header between the SIP registrar (I-CSCF/S-CSCF) 108, 110 and SIP client 116, and update the addresses to match the NAT or PAT lookup.

The Single Radio Voice Call Continuity (SRVCC) Access Control Transfer Function (ACTF) and the Service Centralization and Continuity Application Server (SCC-AS) are functions to support mobile roaming. In the course of roaming, as shown in block 528, the SIP Proxy (P-CSCF) 104 is able to perform SRVCC-ACTF and SCC-AS mapping functions. This functionality handles the consequence of multiple ATCF/SCC-AS mappings based upon the ATCF-Mgmt-URI and combination of the Correlation MSISDN (C-MSISDN) provided by the SCC-AS. These definitions are referenced in 3GPP TS 23.237 and 3GPP TS 23.216. The mapping functions are as follows:

In the SIP REGISTER to the S-CSCF a Unified Access Gateway (UAG) performs the following:
1. Store the original+g.3gpp.atcf-mgmt-uri AND+ g.3gpp.atcf-path URI's.
2. Change the domain portion+g.3gpp.atcf-mgmturi and +g.3gpp.atcf-path to its own fully qualified domain name (FQDN). The user portion of both FQDN's may remain the same.

From SIP MESSAGE from each SCC-AS UAG of the SIP Proxy (P-CSCF) 104 may:
1. Wait for all MESSAGE methods from all SCC-AS's associated with each SIP Registration. The SIP proxy 104 may obtain these by inspecting the C-MSISDN from SRVCC data, usually reported in an XML document. The SIP proxy 104 matches the user portion of the P-Associated-URI's for each SIP Registration and the user portion of the C-MSISDN TEL URI and then sends a new MESSAGE method to the ATCF/P-CSCF based upon the changes below.
2. Match the incoming SIP MESSAGE to the SIP Registration based upon the ATCF-Path-URI in the application/vnd.3gpp.SRVCC-info-xml document and store the associated C-MSISDN and SCC-AS fully qualified domain name (FQDN).
3. Change P-Asserted-Identity to UAG FQDN.
4. Change From: Address to UAG FQDN.
5. Change ATU-STI in application/vnd.3gpp.SRVCC-info-xml to UAG FQDN.
6. Propagate the C-MSISDN associated with the SIP Registration that was not triggered by P-Preferred-Association (i.e. directly associated to the SIP REGISTER IMPU From: Address that came from the ATCF/P-CSCF).

For a RE-INVITE from the ATCF (detected by the use of the UAG FQDN in the INVITE+ the use of TargetDialog) the UAG shall:
1. Inspect the target-dialog header and match the Call-ID with the ongoing Call-ID on the system.
2. When the Call-ID match is found, the system shall take the user-portion of all of the IMPU's in P-Associated-URI's associated with the SIP Registration associated with the Call-ID and match this to C-MSISDN that was stored for that given SIP Registration.
3. Change P-Asserted-Identity to the C-MSISDN that was matched.
4. Change the SIP To: Address to the SCC-AS that was matched.
5. Change from address to the UAGIP.
6. Pass the modified SIP RE-INVITE directly to the SCC-AS and proxy the responding in-dialogue messages including but not exclusive to the "200 OK" message. A trying should be sent immediately.

Exemplary Methods for Application Servers in Batched IMS SIP Registration

Up to this point, the discussion for handling methods once a SIP registration has been effective on and has related to the SIP client 116 and the SIP registrar (I-CSCF/S-CSCF) 108, 110. Here, we turn to communications with the telephony application server 112.

The application server 112, which is accessible to batched IMS SIP registration, is able to relay to another application server and/or subsequently to a SIP proxy (P-CSCF) 104 the P-Associated-To SIP header 304. The SIP header stores SIP CS-URI 312 that was originally used to contact the original application server. Note that the application server may or may not be contacting several IMPUs/URI's on behalf of the originally contacted IMPU/URI. The final application server 112 and SIP proxy 104 in the communications flow may choose to strip this header or alternatively leave the header in the final termination SIP method to the application server 112, SIP proxy 104 and/or the SIP client 116.

The IMS application server 112 is able to parse the P-Preferred-Association header 302 to gather the MSISDN from the CS-URI 312. It can use this MSISDN/URI as needed including for the following:

1. Perform initiation on the Public Land Mobile Network (PLMN) or a re-attempt on the PLMN based upon this MSISDN.
2. Perform or decide not to perform an update in the Home Subscriber Server (HSS) 122 for the STN-SR provided by the ATCF in the case where the MSISDN doesn't match the address of record (AOR) in the SIP Registration between the SIP registrar (I-CSCF/S-CSCF) 108, 110 and the SCC-AS.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A Session Initiation Protocol (SIP) proxy server of an Internet Protocol Multimedia Subsystem (IMS) infrastructure, the SIP proxy server comprising:
   at least one memory adapted to store program code; and
      at least one processor coupled to the at least one memory to access and execute instructions included in the program code to direct the SIP proxy server to:
         receive a single SIP registration request that includes a plurality of IMS Public User Identities (IMPUs), a Mobile Station Identity Subscriber Directory Number (MSISDN) and a Uniform Resource Identifier (URI) for an originator of the single SIP registration request;
         authenticate the plurality of IMPUs that are included in the SIP registration request to determine that multiple IMPUs of the plurality of IMPUs are authorized IMPUs;
         perform a plurality of SIP registrations for the authorized IMPUs, by, for each individual IMPU in the subset of the IMPUs:
            generating a separate registration request for the individual IMPU; and
            forwarding each of the separate registration requests to a home SIP registrar;
         extract the MSISDN and the URI for the originator from the single SIP registration request; and
         perform an initiation or re-initiation on a Public Mobile Land Network (PMLN) based on the MSISDN.

2. The SIP proxy server of claim 1, wherein the instructions to authenticate an IMPU comprises instructions to direct the SIP proxy server to:
   determine whether the SIP proxy server is configured to perform authentication; and
   in response to determining that the SIP proxy server is configured to perform authentication, retrieve, from an external authentication application service, an identity for the IMPU, wherein the identity retrieved from the external authentication application service is authorized to be presented to the home SIP registrar.

3. The SIP proxy server of claim 1, wherein the single SIP registration request contains an identifier for an originator of the single SIP registration request, and wherein the instructions to authenticate an IMPU comprise instructions to direct the SIP proxy server to:
   determine that the SIP proxy server is not configured to perform authentication;
   extract the identifier for the originator from the single SIP registration request; and
   retrieve, from an external data store or an authentication application service, an identity for the IMPU based at least on the identifier for the originator included in the single SIP registration request, wherein the identity retrieved is authorized to be presented to a home SIP registrar.

4. The SIP proxy server of claim 1, wherein the single SIP registration request contains a Uniform Resource Identifier (URI) corresponding to a requested service, and wherein the instructions to authenticate an IMPU comprises instructions to direct the SIP proxy server to:
   extract, from the single SIP registration request, the URI; and
   compare at least a portion of the URI with server-side information.

5. The SIP proxy server of claim 1, wherein the program code further comprises instructions to direct the SIP proxy server to:
   determine a respective identity for each of the plurality of IMPUs;
   attempt to retrieve an IP Multimedia Private Identity (IMPI) from an external data store or application server; and
   if the retrieval attempt fails, generate an IMPI from an external data store or application server.

6. The SIP proxy server of claim 1, wherein the single SIP registration request contains a Mobile Station Identity Subscriber Directory Number (MSISDN) and a Uniform Resource Identifier (URI) for an originator of the single SIP registration request, and wherein the program code further comprises instructions to direct the SIP proxy server to:
   extract the MSISDN and the URI for the originator from the single SIP registration request;
   retrieve an Address of Record (AOR) for a SIP registrar corresponding to the performed SIP registration;
   retrieve a Service Transfer Number from an Access Control Transfer Function (ACTF); and
   update a Home Subscriber Service (HSS) record based on at least one of the MSISDN and URI and the retrieved AOR.

7. A Session Initiation Protocol (SIP) proxy server of an Internet Protocol Multimedia Subsystem (IMS) infrastructure, the SIP proxy server comprising:
   at least one memory adapted to store program code; and
   at least one processor coupled to the at least one memory to access and execute instructions included in the program code to direct the SIP proxy server to:
      receive a single SIP registration request associated with a SIP client;
      authenticate the single SIP registration request;
      communicate with a SIP registrar to place the SIP proxy server in a path to resolve SIP registration paths by placing at least one of a network address or a domain name of the SIP proxy server in a SIP header of the single SIP registration request;

receive a SIP message corresponding to a SIP dialog, the SIP message including a SIP registration identifier;

determine if the SIP proxy server is in a path to resolve SIP registration paths;

upon determining that the SIP proxy server is in the path to resolve SIP registration paths, extract the SIP registration identifier from the SIP message;

select a SIP registration path based at least on the extracted SIP registration identifier by:
matching the SIP registration identifier to SIP registration identifiers for a number of other SIP messages associated with the SIP dialog; and
identifying the SIP registration path based upon a registration path used for the number of other SIP messages; and map the selected SIP registration path to the extracted SIP registration identifier.

8. The SIP proxy server of claim 7, wherein the program code further comprises instructions to direct the SIP proxy server to:
receive a second SIP message specific to the SIP dialog; and
route the second SIP message through the selected SIP registration path mapped to the extracted SIP registration identifier, wherein the instructions to route the second SIP message includes instructions to:
route the second SIP message to an originator of the single SIP registration request in response to determining that the second SIP message is outbound; and
route the second SIP message to a SIP registrar associated with the selected SIP registration path in response to determining that the second SIP message is inbound.

9. The SIP proxy server of claim 7, wherein the program code further comprises instructions to direct the SIP proxy server to:
associate the selected SIP registration path to an identifier of a SIP call invocation;
receive a response for the SIP call invocation; and
route the response to the associated SIP registration path, wherein the instructions to route the response includes instructions to:
route the SIP call invocation to an originator of the single SIP registration request in response to determining that the SIP call invocation is outbound; and
route the SIP call invocation to a SIP registrar associated with the associated SIP registration path in response to determining that the SIP call is inbound.

10. The SIP proxy server of claim 7, wherein the program code further comprises instructions to direct the SIP proxy server to:
receive a SIP message containing a SIP header with an asserted identity;
extract the asserted identity; and
map the asserted identity to the selected SIP registration path.

11. The SIP proxy server of claim 10, wherein the instructions to map the asserted identity to the selected SIP registration path overwrites a previous mapping of a preferred identity.

12. The SIP proxy server of claim 7, wherein the program code further comprises instructions to direct the SIP proxy server to:

receive a network address in a SIP header;
resolve the received network address via a Network Address Translation (NAT) or a Port Address Translation (PAT) to obtain a retrieved network address; and
replace the received network address with the retrieved network address.

13. The SIP proxy server of claim 7, wherein the program code further comprises instructions to direct the SIP proxy server to:
receive a configuration setting to forward SIP headers;
receive, from a SIP registrar, a SIP message with a SIP header; and
forward the SIP header to an originator of the request based at least on the received configuration setting.

14. The SIP proxy server of claim 7, wherein the program code further comprises instructions to direct the SIP proxy server to:
determine that information about the SIP registration path is inconsistent with a Single Radio Voice Call Continuity (SRVCC) Access Control Transfer Function (ACTF) or SCC-AS information during roaming; and
perform at least one SRVCC ATCF or Service Centralization and Continuity Application Server (SCC-AS) mapping function to correct the inconsistency.

15. The SIP proxy server of claim 14, the mapping function comprises at least one mapping function selected from the group consisting of: SIP REGISTER, SIP MESSAGE, and RE-INVITE.

16. A method to process Session Initiation Protocol (SIP) registration requests of an Internet Protocol Multimedia Subsystem (IMS) infrastructure, the method comprising:
receiving, at a SIP proxy server, a single SIP registration request that includes a plurality of IMS Public User Identities (IMPUs), a Mobile Station Identity Subscriber Directory Number (MSISDN) and a Uniform Resource Identifier (URI) for an originator of the single SIP registration request;
authenticating each of the plurality of IMPUs included in the single SIP registration request to determine multiple authenticated IMPUs of the plurality of IMPUs;
performing an independent and separate SIP registration for each of the multiple authenticated IMPUs by, for each individual IMPU in the multiple authenticated IMPUs:
generating a separate registration request for the individual IMPU; and
forwarding each of the separate registration requests to a home SIP registrar;
extracting the MSISDN and the URI for the originator from the single SIP registration request; and
performing an initiation or re-initiation on a Public Mobile Land Network (PMLN) based on the MSISDN.

17. The method of claim 16 wherein the single SIP registration request contains an identifier for an originator of the request, and wherein authenticating each of the plurality of IMPUs comprises:
determining that the SIP proxy server is not configured to perform authentication;
extracting from the single SIP registration request the identifier for the originator; and
retrieving, from an external data store or application server, an identity for at least one IMPU based at least on the extracted identifier for the originator, wherein the retrieved identity is authorized to be presented to the home SIP registrar.

18. The method of claim 16, wherein authenticating each of the plurality of IMPUs comprises:

extracting, from the single SIP registration request, a uniform resource identifier (URI); and comparing at least a portion of the extracted URI with server side information.

19. The method of claim 16 wherein determining a respective identity for each of the plurality of IMPUs comprises:

attempting to retrieve an IP Multimedia Private Identity (IMPI) from an external data store or application server; and if the retrieval attempt fails, generating an IMPI from an external data store or application server.

* * * * *